Patented June 6, 1944

2,350,544

UNITED STATES PATENT OFFICE 2,350,544

GREASE COMPOSITION

John C. Zimmer, Union, and Arnold J. Morway, Clark Township, Union County, N. J., assignors to Standard Oil Development Company, a corporation of Delaware No Drawing. Application November 28, 1942, Serial No. 467,204

8 Claims. (Cl. 252—35)

The present invention relates to grease compositions possessing high load-carrying characteristics and a method of preparing the same.

The tendency in mechanical design has always been towards mechanical equipment of increased output. One result emanating from this tendency has been the utilization and adaptation of mechanical elements such as bearings and gears which are operated at higher speeds and under increased load or pressure. Many times it is a change in the design of the mechanical element itself, such as the use of hypoid gears instead of straight tooth gears, which is the cause of the change in mechanical operating conditions. Also these radical changes in mechanical design have given rise to at times serious lubricating problems. Particularly has this been so where heavy loading, which results in high pressures, has been encountered. In many instances inventors have been able to combat the problem of supplying adequate lubrication to bearings and gears operating under extra heavy pressures by the use of extreme pressure lubricants which are for the most part mineral oils containing additives which enhance the load-bearing characteristics of the oil. Mechanical parts operating under pressures of 5000 pounds per square inch are deemed to require the use of an extreme pressure lubricant although pressures of 10,000 pounds per square inch and more are not uncommon. Mineral lubricating oil alone, depending upon conditions of speed and temperature, will sustain and provide adequate lubrication for loads as high as 3000 pounds per square inch. The lubricity of mineral oil is often increased by the addition thereto of animal or vegetable oils, by the use of which, compositions capable of furnishing lubrication under loads as high as 6000 pounds per square inch can be obtained. For the lubrication of mechanical parts operating under pressures in excess of 6000 pounds per square inch, compositions containing special extreme pressure lubricants must be resorted to.

It quite frequently happens that the mechanical part operating under extreme pressure is not designed to retain fluid lubricant and in other instances the housings, cases or boxes within which the mechanical parts run are incapable of construction so as to retain fluid lubricant. Under such circumstances it is necessary to resort to the use of semi-solid or grease lubricants which consist customarily of mineral oil thickened to a semi-solid consistency or grease structure by the use of soap. Ordinary greases, however, when subjected to extreme pressures, break down, losing their grease structure and reverting to a liquid consistency. Most attempts to secure a grease capable of carrying high loads have met with failure due to the incompatibility existing between extreme pressure additives and the soaps used to thicken the oil to a grease-like structure.

The principal object of the present invention is the production of a grease composition capable of withstanding high loading without loss of the grease-like structure. Other and further objects will be apparent to those skilled in the art upon reading the following description.

It has now been discovered that a salt resulting from the combination of a high molecular weight mercaptan with a polyvalent metal has good bodying or thickening action on a mineral oil and that the greases derived from the incorporation of these salts in mineral oils are capable of withstanding extreme pressures in service without loss of grease structure. In the production of stable greases from mineral oil and mercaptides according to the present invention, it has been found most desirable to use from 10 to 20% of the mercaptide in the grease. Compositions containing from 6 to 10% of the mercaptide possess good load-carrying characteristics but give semi-fluid structures and require the addition of other soap thickeners to attain a solid grease structure.

Although a wide range of lubricating oils may be employed in the production of the grease compositions of this invention, in general the base oil comprises an oil having a viscosity in the range of from about 35 to 1100 seconds at 210° F. and preferably from about 50 to 200 seconds S. U. V. at 210° F.

Any of the polyvalent metals such as lead, zinc, calcium, barium or magnesium can be used for the production of the thio salts although it is preferred to use lead because of the additional load-carrying ability secured thereby. The negative radical of the thio salt is furnished by a high molecular weight mercaptan preferably of from 10 to 20 or more carbon atoms to the molecule, such as lauryl mercaptan, etc. Instead of the high molecular weight mercaptans, if desired the negative radical of the thio salts may be derived from sulfur-chlorine compounds resulting from the reaction of a chlorinated hydrocarbon with a sulfide or hydrosulfide, such as $Na_2S$, $NaHS$, $Na_2S_x$. In the event that the amount of mercaptide incorporated in the lubricating oil is not sufficient to give a good grease structure, additional soaps such as those which are customarily used for the production of a good soap lubricating grease like sodium, aluminum, calcium or barium stearate or the alkali or alkaline earths, metal soaps of saturated or unsaturated fats or fatty acids may be used to insure a good grease structure in the composition. Not more than about 5 to 15% of soap should be required for this purpose.

The mercaptides can be made by reacting the corresponding mercaptan directly with the oxide of the polyvalent metal as, for instance, lauryl mercaptan and litharge (PbO) can be mixed together heated sufficiently to induce and cause the reaction. The reaction product can then be isolated and then incorporated into the mineral lubricating oil. Incorporation of the mercaptide into the mineral lubricating oil usually requires mild heating, the extent of which depends largely upon the molecular weight of the mercaptan used. Generally it will be found unnecessary to exceed about 300° F. in securing solution of the mercaptide in the mineral lubricating oil. After the mercaptide is in solution, any undissolved material, such as unreacted oxide, may be removed either by decantation or filtration. Upon cooling, the mineral oil and mercaptide composition will form a stable grease of good structure. The mercaptides used in accordance with this invention can also be produced by a double decomposition between sodium mercaptides and the chlorides of the bivalent metals.

The following examples will serve to illustrate the invention:

Example I 50 gms. of lauryl mercaptan were mixed with 10 gms. of litharge (PbO) and heated with stirring to a temperature between 150 and 200° F. for 1 hour. The reaction mixture was then filtered to remove unreacted mercaptan or unreacted liquid and the resulting filter cake was dissolved in 500 gms. of mineral lubricating oil (a Coastal oil of 50 seconds at 210° F.), at 150° F. The hot oil was then filtered to remove any solid matter (mostly unreacted litharge) and the filtrate on cooling forms a grease of the following characteristics.

A. S. T. M. penetration unworked (77° F)____320
A. S. T. M. melting point_____ 140° F.
Extreme pressure properties, Almen
    machine test_____
    __15 weights carried or approximately 1500 lbs.
Pin condition_____ Excellent

Example II

The product was prepared as in Example I and after filtration was blended into a grease having the following formula:

|   | Per cent |
|---|---|
| Lard oil | 9.23 |
| Hydrated lime | 1.32 |
| Water | 0.92 |
| Mineral oil having an S. S. U. viscosity of 72 seconds at 100° F | 88.53 |

Penetration at 77° F_____ 300
Timken O. K. load_____
    _____ 51 pounds approx. 30,000 lbs./in.²
Abrasion loss_ 0.0030 gram. (20 lb. load for 6 hrs)
Almen test_____ 15 weights carried, pin-polished

What is claimed is:
1. A grease composition comprising a mineral lubricating oil and from 6–20% of a mercaptide of a mercaptan having at least 10 carbon atoms to the molecule and a polyvalent metal.
2. A grease composition consisting of a mineral lubricating oil and from 10 to 20% of a mercaptide in which the positive ion is a polyvalent metal and the negative ion contains at least 10 carbon atoms.
3. A grease composition comprising mineral lubricating oil and from 6 to 20% of a lead mercaptide the negative ion of which contains at least 10 carbon atoms.
4. A grease composition consisting of a mineral lubricating oil and from 10–20% of a lead mercaptide in which the negative ion contains at least 10 carbon atoms.
5. A grease composition comprising a mineral lubricating oil and from 6–20% of lead lauryl mercaptide.
6. A grease composition consisting of a mineral lubricating oil and from 10 to 20% of lead lauryl mercaptide.
7. A grease composition comprising a mineral lubricating oil, from 6–10% of a mercaptide in which the positive ion is a polyvalent metal and the negative ion contains at least 10 carbon atoms, and from 5–15% of an oil-thickening soap.
8. A grease composition consisting of a mineral lubricating oil having a Saybolt viscosity of 50 at 210° F., 6% lead lauryl mercaptide and 15% sodium stearate.

JOHN C. ZIMMER.
ARNOLD J. MORWAY.